United States Patent [19]

Raney

[11] Patent Number: 4,732,611

[45] Date of Patent: Mar. 22, 1988

[54] WOOD POLISH

[75] Inventor: Ralph Raney, Franklin, Mich.

[73] Assignee: Formula "R" Corporation, Southfield, Mich.

[21] Appl. No.: 598,485

[22] Filed: Apr. 9, 1984

[51] Int. Cl.⁴ .............................................. C09G 1/06
[52] U.S. Cl. .......................................... 106/9; 106/11
[58] Field of Search ..................................... 106/9, 11

[56] References Cited

U.S. PATENT DOCUMENTS

| 581,398 | 4/1897 | Mackie | 106/9 |
| 1,038,694 | 9/1912 | Webster | 106/9 |
| 1,222,441 | 4/1917 | Milburn | 106/9 |
| 1,457,080 | 5/1923 | Kuhn | 106/9 |
| 1,472,402 | 10/1923 | Snyder | 106/9 |
| 1,496,735 | 6/1924 | Parker | 106/9 |
| 1,572,021 | 2/1926 | Johansen | 106/9 |
| 1,630,699 | 5/1927 | Frostman | 106/9 |
| 2,098,607 | 11/1937 | Allen et al. | 106/9 |

FOREIGN PATENT DOCUMENTS

| 364 | of 1879 | United Kingdom | 106/9 |
| 14245 | of 1888 | United Kingdom | 106/9 |
| 1896 | of 1896 | United Kingdom | 106/9 |
| 3834 | of 1911 | United Kingdom | 106/9 |
| 261161 | 11/1926 | United Kingdom | 106/9 |
| 246380 | 11/1926 | United Kingdom | 106/9 |
| 384229 | 12/1932 | United Kingdom | 106/9 |
| 1011344 | 11/1965 | United Kingdom | 106/9 |

*Primary Examiner*—Amelia Burgess Yarbrough
*Attorney, Agent, or Firm*—Lloyd M. Forster

[57] ABSTRACT

A wood polish comprising a vinegar solvent, oil base and oleoresin suitable for use in both cleaning and polishing furniture in a single operation. A preferred embodiment includes linseed oil, turpentine and vinegar.

4 Claims, No Drawings

WOOD POLISH

BACKGROUND OF THE INVENTION

Effective application of wood polish generally requires a separate preliminary cleaning operation in order to obtain optimum results. Some furniture polishes are sold for use as combination cleaning and polishing agents which do not employ vinegar as one of the constituents and, in comparison with applicant's polish, lack equal cleaning power, as well as duration of luster.

Certain constituents of the present application polish have been employed in a wood finishing composition as disclosed in U.S. Pat. No. 4,240,939; however, not in applicant's complete composition suitable for use as a cleaning polish on a completely finished wood surface.

SUMMARY OF THE PRESENT INVENTION

The present invention is a wood cleaning and polishing composition made of equal parts of linseed oil, turpentine and vinegar which may be applied and rubbed out in a single application.

DETAILED DESCRIPTION OF THE INVENTION

In a preferred embodiment equal parts of boiled linseed oil, pure gum turpentine and cider vinegar are combined in a cleaning and polishing composition which, after thorough mixing, can be applied under the following Directions:

Shake well before and during usage. Work needed amount into soft cloth and apply, cleaning surface during the application. With second clean soft cloth polish surface thoroughly. For additional luster, turn cloth and buff. After applying it is optional to polish any wood surface immediately; or if surface is non-absorbing, to apply on all articles to be polished and wait up to two hours. Depending on porosity of surface, a shorter wait with polishing before absorption may be required for best results.

A single application has been found to retain its luster for a period of approximately three months and repeated applications, without the need for separate cleaning operations, have been found to be highly satisfactory.

Full effectiveness requires employment of all three specified ingredients and the result of varying the proportions has been found to affect the results as follows:

When the amount of boiled linseed oil has been reduced to one-half the specified equal proportion, the consistency of the polish is reduced and the luster noticeably diminished.

If the amount of turpentine is reduced to one-half of the specified equal proportion, the consistency becomes too thick for suitable application.

If the amount of vinegar is reduced by as much as one-half of the specified equal proportion the polish loses some of its cleaning power and also loses luster before the normal time.

Accordingly, as a result of experimental tests, a preferred embodiment has been found to include equal proportions of the three required ingredients with a limit for satisfactory results to no reduction in any of the three ingredients to less than one-half of its equal proportion in the preferred embodiment.

I claim:

1. Combination wood cleaning and polishing composition consisting of boiled linseed oil, pure gum turpentine, and vinegar wherein each of said three ingredients consists of at least one-fifth by volume of the total composition.

2. The composition of claim 1 wherein said vinegar comprises cider vinegar.

3. The composition of claim 1 wherein substantially equal parts by volume of the three ingredients are employed.

4. The composition of claim 2 comprising substantially equal parts by volume of the three ingredients.

* * * * *